US009458061B2

(12) United States Patent
Mantegazza

(10) Patent No.: US 9,458,061 B2
(45) Date of Patent: Oct. 4, 2016

(54) CEMENTITIOUS MORTAR AND METHOD FOR IMPROVED REINFORCEMENT OF BUILDING STRUCTURES

(75) Inventor: Giovanni Mantegazza, Gorgonzola (IT)

(73) Assignee: RUREDIL S.p.A., Milan (IT)

( * ) Notice: Subject to any disclaimer, the term of this patent is extended or adjusted under 35 U.S.C. 154(b) by 0 days.

(21) Appl. No.: 13/375,303

(22) PCT Filed: Sep. 18, 2009

(86) PCT No.: PCT/EP2009/062106
§ 371 (c)(1),
(2), (4) Date: Nov. 30, 2011

(87) PCT Pub. No.: WO2010/142352
PCT Pub. Date: Dec. 16, 2010

(65) Prior Publication Data
US 2012/0067505 A1    Mar. 22, 2012

(30) Foreign Application Priority Data
Jun. 12, 2009    (IT) .............................. MI2009A1046

(51) Int. Cl.
| C04B 26/06 | (2006.01) |
| E04F 13/02 | (2006.01) |
| C04B 24/26 | (2006.01) |
| C04B 24/40 | (2006.01) |
| C04B 14/06 | (2006.01) |
| C04B 14/22 | (2006.01) |
| C04B 14/42 | (2006.01) |

(Continued)

(52) U.S. Cl.
CPC .............. *C04B 28/02* (2013.01); *C04B 14/42* (2013.01); *C04B 16/02* (2013.01); *C04B 18/146* (2013.01); *C04B 20/0076* (2013.01); *C04B 24/2641* (2013.01); *C04B 24/383* (2013.01); *C04B 2103/32* (2013.01); *C04B 2103/40* (2013.01); *Y02W 30/94* (2015.05)

(58) Field of Classification Search
USPC .......................... 524/5, 31, 494, 560; 156/71
See application file for complete search history.

(56) References Cited

U.S. PATENT DOCUMENTS

| 3,902,912 A | 9/1975 | Wolf |
| 4,067,744 A * | 1/1978 | Ohtomo ................. C03C 3/089 106/698 |

(Continued)

FOREIGN PATENT DOCUMENTS

| DE | 195 25 508 | 2/1996 |
| DE | 1 245 547 | 2/2002 |

(Continued)

OTHER PUBLICATIONS

JP 50034324 A, Apr. 1975, Derwent Ab.*

(Continued)

*Primary Examiner* — Satya Sastri
(74) *Attorney, Agent, or Firm* — Oblon, McClelland, Maier & Neustadt, L.L.P

(57) ABSTRACT

Cementitious mortar with improved characteristics for forming structures incorporating synthetic fibres, in particular in the form of webs, for reinforcing building structures. The mortar comprises a methylmethacrylate/n-butylacrylate copolymer resin and glass filaments dispersed in the mortar. The invention also relates to a reinforcement method for building structures, using said mortar.

18 Claims, 1 Drawing Sheet

(51) Int. Cl.
*C04B 14/44* (2006.01)
*C08F 220/14* (2006.01)
*C08F 220/16* (2006.01)
*C04B 28/02* (2006.01)
*C04B 16/02* (2006.01)
*C04B 24/38* (2006.01)
*C04B 20/00* (2006.01)
*C04B 18/14* (2006.01)
*C04B 103/32* (2006.01)
*C04B 103/40* (2006.01)

(56) References Cited

U.S. PATENT DOCUMENTS

| | | | |
|---|---|---|---|
| 4,975,396 A * | 12/1990 | Thiery | 501/99 |
| 5,225,237 A | 7/1993 | Magnani | |
| 5,753,036 A * | 5/1998 | Hornaman et al. | 106/810 |
| 6,602,937 B2 * | 8/2003 | Hara et al. | 524/5 |
| 2003/0005861 A1 * | 1/2003 | Dietrich | C04B 40/0608 106/727 |
| 2004/0025465 A1 | 2/2004 | Aldea et al. | |
| 2008/0286553 A1 | 11/2008 | Mantegazza | |

FOREIGN PATENT DOCUMENTS

| | | | | |
|---|---|---|---|---|
| DE | WO 2005105702 A1 * | 11/2005 | | B63H 3/008 |
| EP | 0 202 620 | 5/1986 | | |
| EP | 0 363 875 | 4/1990 | | |
| EP | 0 732 464 | 12/1995 | | |
| EP | 1 245 547 | 10/2002 | | |
| EP | 1245547 A1 * | 10/2002 | | |
| JP | 50034324 A * | 4/1975 | | |
| WO | 2007 054388 | 5/2007 | | |

OTHER PUBLICATIONS https://www.akzonobel.com/cs/system/images/AkzoNobel_Bermocoll_E_411_FQ_tcm54-16772.pdf, Dec. 2011.*
G. K. AlChaar, et al., "Ghassan K. Al-Chaar, Steven C. Sweeney, Jonathan C. Trovillion, Orange S. Marshall and Brenda Danielson: Pseudo Dynamic Testing and Seismic Rehabilitation of Iraqi Brick, Bearing and Shear Walls", U.S. Army Corps of Engineers, Engineer Research and Development Center, Apr. 2008. pp. 27-29 and pp. 75-78. (Apr. 2008).*
Analysis of CEMSHIELD distributed by TM SRC Italia, Apr. 2005.*
Analysis of QUIKWALL of QUIKRETE , May 2005.*
Pei et al., Journal of applied Sci., vol. 93, 2403-2409, (2004).*
International Search Report Issued Mar. 30, 2010 in PCT/EP09/062106 Filed Sep. 18, 2009.
Notice of Opposition to European Patent No. 09783165.5, Jan. 8, 2015.
Analysis of CEMSHIELD distributed by ™SRC Italia, Apr. 29, 2005.
Quickwall Specification Data 2001.
QUIKRETE Concrete Acrylic Fortifier Technical Sheet, Sep. 7, 2012.
Analysis of QUIKWALL of QUIKRETE, May 2005.

* cited by examiner

CEMENTITIOUS MORTAR AND METHOD FOR IMPROVED REINFORCEMENT OF BUILDING STRUCTURES

The present invention relates to a cementitious mortar for reinforcing building structures, in particular existing building structures (for example masonry, concrete and reinforced concrete structures, such as pillars, columns, beams, vault consolidation). Building structures are subject to deterioration due to various reasons, for example environmental and man-made chemical action, constructional defects, poor quality or unsuitable choice of the materials used, seismic events, etc.

It has been proposed to use electrowelded metal netting to wrap structural supports to be reinforced, this involving considerable installation difficulty and the fact that metal netting is easily subject to corrosion.

It has been proposed to apply (to the surface of a structure to be reinforced) fibres or fibre-based fabric of various types (carbon, glass or synthetic fibres) by using resins (generally epoxy). This solution, known as FRP (fibre-reinforced polymer) presents the drawback of a maximum resin operating temperature (about 80° C.), such that the reinforcement can rapidly yield in case of fire. The resins used are harmful to the environment and to the operators, and the costs of this method are high. Moreover the applied resin does not allow transpiration, forming a barrier to moisture, which cannot easily leave the structure.

U.S. Pat. No. 7,311,964 describes a reinforcement method by which an AR-glass fibrous layer is embedded into an inorganic matrix which is then applied to the surface of the structural support to be reinforced. The AR-glass fibrous layer has a sizing applied thereon and a resinous coating is applied over the sizing. The inorganic matrix is adherent to the resinous coating and the resinous coating is adhered to the sizing. This reinforcement method also has the drawback of being sensitive to heat (for example, in case of fire) and having a high cost.

DE 19525508 proposes to apply a cementitious mortar to the structure to be repaired, then a fabric reinforcement mesh, and then a second cementitious mortar layer. According to this document, the mortar is composed of a mixture of cement, inerts and an aqueous dispersion of styrene/acrylate copolymer as the preferred binder. The presence of the dispersion gives the mixture considerable fluidity, tending to make it impossible to apply to vertical surfaces.

The high water/cement ratio in the starting mixture, moreover, is detrimental to the mechanical features of the material after it gets dried, with likely crack formation and crumbling.

EP1245547B proposes a cementitious mortar for forming reinforcements incorporating synthetic fibre lattices. In addition to cement and inerts, the mortar contains an unsaturated copolymer, and superfluidizing and fluidizing additives based on lignin sulphonates betanaphtalene or melamine-formaldehyde and thixotropic additives pertaining to the cellulose class, these mortar components being present in the quantities specified in the patent.

The mortar is in the form of dry powder, the water being added at the time of installation. It is important to note that the presence of the additives enables the mortar to be easily applied to the surface of brick or concrete (reinforced or non-reinforced) building structures, even with reduced water quantities, making it hence possible to apply the reinforcement to vertical surfaces and improve the material properties after hardening, so preventing or reducing crack formation and crumbling.

WO2007/054388A1 and the corresponding applications EP1893793A and US2008/0286553A1 describe a component for reinforcing existing building structures, this component differing from that of the said EP1245547B in that the synthetic fibre embedded into the mortar and acting as its mechanical reinforcement is formed from poly[benz(1,2-D:5,4-D')bisoxazole-2,6-diyl-1,4-phenylen], known commercially under the registered name "Zylon": this fibre has proved to have (in addition to high breakage strength and high stretch resistance) an exceptionally high surface adherence to the cement (of the composition described in EP1245547B) in which it is embedded.

The teachings of EP1245547 and WO2007/054388A are incorporated herein for reference.

Figure 1:
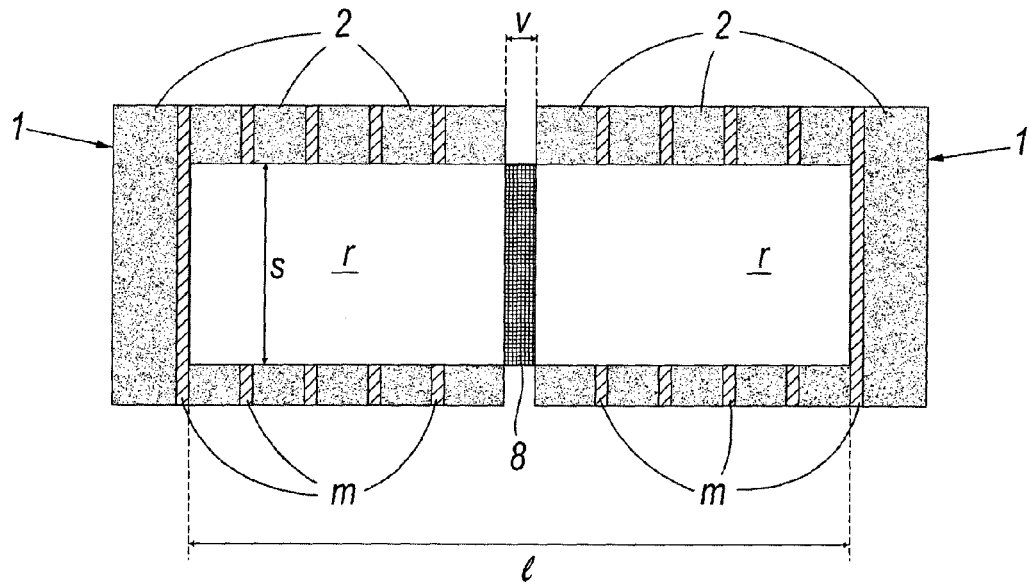
FIG. 1 shows a schematic of a test piece used for the analysis.

According to the present invention, it has been found possible to improve the mechanical properties of the reinforcement for building structures, in particular its delamination resistance even under considerable deformation, in addition to its capacity to withstand higher stresses.

These results were attained according to the present invention by a cementitious mortar for forming reinforcement structures incorporating webs for reinforcing building structures, the mortar comprising from 5% to 95% of cement, from 10% to 70% of inert mineral fillers with particle dimensions less than 700 micron, from 0.05% to 2.5% of fluidifying and superfluidifying additives and from 0.005% to 1% of thixotropic additives of the cellulose class, characterised by comprising between 0.1% and 25% of a methylmethacrylate/n-butylacrylate copolymer resin and between 0.05% and 30% of glass filaments, in particular alkali resistant glass, dispersed in the mortar, said filaments having a length between 1 and 30 mm and a diameter between 5 and 100 micron, the percentages being by weight referred to the total weight of the cementitious mortar.

Preferred values for glass filament quantity are between 0.4 and 23% by weight. The length of said glass filaments is preferably between 3 mm and 24 mm and their diameter is between 8 and 85 micron.

Preferred values for the quantity of the copolymer resin present in the mortar are between 0.05% and 18% by weight based on the weight of the mortar.

Examples of cement usable in the mortar are Portland cement, composite Portland cement, blast furnace cement, pozzolan cement, composite cement and their subtypes and or mixtures, hydraulic and/or aerial binders, limes, silicates, aluminates, the pozzolan cements or composites being preferred. Preferred quantities are between 20% and 70%.

The mineral fillers can be, for example, of quartziferous, siliceous, calcareous, magnesiac, arenaric or granitic nature, or be by-products of other processes such as silica fume and fly ash. Mixtures of said fillers are preferred.

Fluidifying additives include both superfluidifying and fluidifying additives, pertaining to the class of polymers based on lignin polycondensates, betanaphthalenic or melamine-formaldehyde sulphonates (LS, NFS or MS), or based on modified polyacrylate chains (ACR).

Examples of thixotropic additives pertaining to the cellulose class are methylcellulose, methylhydroxyethylcellulose, methylhydroxypropylcellulose, hydroxyethylcellulose, hydroxypropylcellulose, carboxymethylcellulose, carboxymethylhydroxyethylcellulose. Methylcellulose and its derivatives are preferred.

Quantities of thixotropic additives between 0.015% and 0.65% are preferred, they leading to better results.

If desired, the mortar can comprise other additives; these include aerating additives, in particular anionic, cationic, non-ionic or amphoteric aerating additives, such as quaternary ammonium salts, mixed laurylsulphonic acid salts, fluorophenylborates, nonylphenol with different degrees of ethoxylation, etc. Laurylsulphonic acid derivatives are preferred: the preferred quantities vary from 0.01% to 1.5%.

Other examples of additives which can form part of the mortar are additives for opposing mortar shrinkage during both the plastic and hardened phase, such as mixtures of sulphoaluminates and oxides. The preferred quantities are between 0.1% and 10%, most preferred being between 0.3% and 5%.

The mortar of the present invention is generally in the form of a powder which can be activated by adding water, as is commonly done for cementitious mortars. The mortar formulation allows the use of a reduced water quantity, to generate a mix also applicable to vertical surfaces without any problems arising involving downward slippage of the unhardened mortar, or fissure formation. The mortar is obtained by mixing the components in particular in the form of powder and the glass filaments together, according to the method commonly used in the art.

The cementitious mortar of the present invention can be applied to building structures (already existing or not) of masonry (bricks, stone material and the like) or of concrete, including reinforced concrete. The synthetic fibres used in the form of webs or meshes for reinforcing the building structures are chosen in particular from those commonly used for reinforcements of this type, for example carbon fibres, glass fibres, polymer fibres such as aramid fibres, polyester fibres, polyethylene fibres, poly[benz(1,2-D:5,4-D')bisoxazole-2,6-diyl-1,4-phenylen] fibres (CAS 60857-81-0), for example that produced by the Toyobo Company under the commercial name of "Zylon" or others, and also mixtures of fibres of different types; in this latter case mixtures of two fibres are preferred in which one fibre represents from 10% to 90 wt % of the total fibres, preferably 50%.

According to a possible mode of operation, the synthetic fibre webs are in the form of netting with square apertures of dimensions between 10 and 35 mm, for example 11, 26 or 35 mm, or such webs can consist of threads disposed in mutually superposed crossing layers.

Hence a web means a net or fabric, which can be of the same known type as those commonly used in the building structure field. Depending on requirements, these webs can be single or multi-directional, i.e. able to withstand tensile forces in one or more directions, several superposed webs being possible.

The invention also relates to a method for reinforcing building structures, comprising applying a first layer of mortar (as heretofore described) to a building structure surface, then superposing and embedding a synthetic fibre web on and in said first layer of mortar, and finally applying a second layer of mortar onto said synthetic fibre web and onto said first mortar layer.

According to a possible mode of operation, a first layer of mortar (suitably mixed with water) is applied to the previously cleaned and moistened structure surface; this is followed by the application of synthetic fibres onto said first layer of mortar, then the application of a second layer of mortar (mixed with water) onto the synthetic fibres and the hardening of the mortar. The thickness of the two mortar layers, which can be equal or different, can be chosen on the basis of requirements; for example, both layers can have as thickness of about 3 mm. Preferably the synthetic fibres forming a web are pressed against the first mortar layer until they are incorporated therein. If several webs are used, care will preferably be taken to position them with their fibres staggered, interposing a thin mortar layer between them.

It has been verified that the reinforcements obtained with the mortar according to the present invention present mechanical characteristics which are considerably superior to those obtainable with other mortars, in particular those obtained in accordance with EP1245547B and EP1893793A.

Some examples of compositions (the percentages being by weight on the total weight of each mortar) of thirteen different mortars, while indicating the for each mortar the reinforcing effect obtained by their use on masonry structures subjected to bending tests, will now be detailedly described.

EXAMPLE 1

Mortar A

| | |
|---|---|
| Pozzolan cement | 50.25% |
| Methylmethacrylate/n-butylacrylate copolymer resin | 8.00% |
| Methylcellulose | 0.10% |
| AR-glass filament, diameter 17 micron, length 18 mm | 3.00% |
| Quartz 0.1-0.35 mm | 28.40% |
| Silica fume | 6.50% |
| ARC (acrylic superfluidifier) | 0.50% |
| Ether lauryl sulphate | 0.25% |
| Anti-shrink additive | 3.00% |

EXAMPLE 2

Mortar B

| | |
|---|---|
| Pozzolan cement | 6.80% |
| Methylmethacrylate/n-butylacrylate copolymer resin | 20.00% |
| Methylcellulose | 0.10% |
| AR-glass filament, diameter 17 micron, length 18 mm | 3.00% |
| Quartz 0.1-0.35 mm | 60.65% |
| Silica fume | 6.50% |
| ARC (acrylic superfluidifier) | 2.20% |
| Ether lauryl sulphate | 0.25% |
| Anti-shrink additive | 0.5% |

EXAMPLE 3

Mortar C

| | |
|---|---|
| Pozzolan cement | 87.277% |
| Methylmethacrylate/n-butylacrylate copolymer resin | 0.5% |
| Methylcellulose | 0.006% |
| AR-glass filament, diameter 17 micron, length 18 mm | 0.075% |
| Quartz 0.1-0.35 mm | 5.792% |
| Silica fume | 5.00% |

| | |
|---|---|
| ARC (acrylic superfluidifier) | 0.05% |
| Ether lauryl sulphate | 0.10% |
| Anti-shrink additive | 1.20% |

EXAMPLE 4

Mortar D

| | |
|---|---|
| Pozzolan cement | 40.25% |
| Methylmethacrylate/n-butylacrylate copolymer resin | 7.00% |
| Methylcellulose | 0.9% |
| AR-glass filament, diameter 17 micron, length 18 mm | 23.00% |
| Quartz 0.1-0.35 mm | 20.40% |
| Silica fume | 6.50% |
| ARC (acrylic superfluidifier) | 0.50% |
| Ether lauryl sulphate | 0.25% |
| Anti-shrink additive | 1.2% |

EXAMPLE 5

Mortar E

| | |
|---|---|
| Pozzolan cement | 41.55% |
| Methylmethacrylate/n-butylacrylate copolymer resin | 23.90% |
| Methylcellulose | 0.90% |
| AR-glass filament, diameter 17 micron, length 18 mm | 3.00% |
| Quartz 0.1-0.35 mm | 20.40% |
| Silica fume | 6.50% |
| ARC (acrylic superfluidifier) | 0.50% |
| Ether lauryl sulphate | 0.25% |
| Anti-shrink additive | 3.00% |

EXAMPLE 6

Mortar F

| | |
|---|---|
| Pozzolan cement | 6.25% |
| Methylmethacrylate/n-butylacrylate copolymer resin | 0.30% |
| Methylcellulose | 0.006% |
| AR-glass filament, diameter 17 micron, length 18 mm | 19.394% |
| Quartz 0.1-0.35 mm | 53.40% |
| Silica fume | 15.00% |
| ARC (acrylic superfluidifier) | 2.40% |
| Ether lauryl sulphate | 0.25% |
| Anti-shrink additive | 3.00% |

EXAMPLE 7

Mortar G

| | |
|---|---|
| Pozzolan cement | 50.25% |
| Methylmethacrylate/n-butylacrylate copolymer resin | 24.00% |
| Methylcellulose | 0.10% |
| AR-glass filament, diameter 80 micron, length 18 mm | 3.00% |
| Quartz 0.1-0.35 mm | 16.40% |
| Silica fume | 2.50% |
| ARC (acrylic superfluidifier) | 0.50% |
| Ether lauryl sulphate | 0.25% |
| Anti-shrink additive | 3.00% |

EXAMPLE 8

Mortar H

| | |
|---|---|
| Pozzolan cement | 10.25% |
| Methylmethacrylate/n-butylacrylate copolymer resin | 22.50% |
| Methylcellulose | 0.10% |
| AR-glass filament, diameter 17 micron, length 9 mm | 27.00% |
| Quartz 0.1-0.35 mm | 30.90% |
| Silica fume | 5.50% |
| ARC (acrylic superfluidifier) | 0.50% |
| Ether lauryl sulphate | 0.25% |
| Anti-shrink additive | 3.00% |

The following examples 9 to 12 are comparative examples.

EXAMPLE 9

Mortar I

| | |
|---|---|
| Pozzolan cement | 24.75% |
| Methylmethacrylate/n-butylacrylate copolymer resin | 5.00% |
| Methylcellulose | 0.10% |
| AR-glass filament, diameter 17 micron, length 18 mm | 31.50% |
| Quartz 0.1-0.35 mm | 28.40% |
| Silica fume | 6.50% |
| ARC (acrylic superfluidifier) | 0.50% |
| Ether lauryl sulphate | 0.25% |
| Anti-shrink additive | 3.00% |

This mortar is impossible to mix: the fibres form "pellets" which do not disperse even under strong agitation. Bending tests to determine the maximum load were not carried out.

EXAMPLE 10

Mortar L

| | |
|---|---|
| Pozzolan cement | 51.21% |
| Methylmethacrylate/n-butylacrylate copolymer resin | 10.00% |
| Methylcellulose | 0.10% |
| AR-glass filament, diameter 17 micron, length 18 mm | 0.04% |
| Quartz 0.1-0.35 mm | 28.40% |
| Silica fume | 6.50% |
| ARC (acrylic superfluidifier) | 0.50% |
| Ether lauryl sulphate | 0.25% |
| Anti-shrink additive | 3.00% |

EXAMPLE 11

Mortar M

The composition of this mortar is analogous to that of Mortar A, but is without the glass filaments.

| | |
|---|---|
| Pozzolan cement | 50.25% |
| Methylmethacrylate/n-butylacrylate copolymer resin | 8.00% |
| Methylcellulose | 0.10% |
| Quartz 0.1-0.35 mm | 31.40% |
| Silica fume | 6.50% |
| ARC (acrylic superfluidifier) | 0.50% |
| Ether lauryl sulphate | 0.25% |
| Anti-shrink additive | 3.00% |

EXAMPLE 12

Mortar N

| | |
|---|---|
| Pozzolan cement | 55.25% |
| Methylcellulose | 0.10% |
| AR-glass filament, diameter 17 micron, length 18 mm | 3.00% |
| Quartz 0.1-0.35 mm | 31.40% |
| Silica fume | 6.50% |
| ARC (acrylic superfluidifier) | 0.50% |
| Ether lauryl sulphate | 0.25% |
| Anti-shrink additive | 3.00% |

It will be noted that in the compositions of the aforegoing Examples, ether lauryl sulphate and the anti-shrink additive are always mentioned, however their presence is not indispensable even if preferable (within the limits of 0.001% to 1.5% for the ether lauryl sulphate and 0.3% to 5% for the anti-shrink additive).

It is also important to note that the compositions of comparative Mortar I (Example 9) and Mortar L (Example 10) comprise glass filaments in a percentage quantity which is slightly outside the ranges specified in the claims of the present invention; that comparative Mortar M has a composition analogous to that of Mortar A but is without the glass filaments; and that Mortar N is without the methylmethacrylate/n-butylacrylate copolymer resin.

To verify and evaluate the improvement in the resistance of building structures reinforced with cementitious mortars of the present invention, an experimental campaign was carried out to determine the maximum load which caused them to separate from a masonry test piece (i.e. the maximum breaking load of the test piece) subjected to a bending test.

To understand how the tests were carried out, reference will be firstly made to the accompanying drawing in which:

FIG. 1 is a schematic plan view of a test piece used in the tests, and

Figure 2:
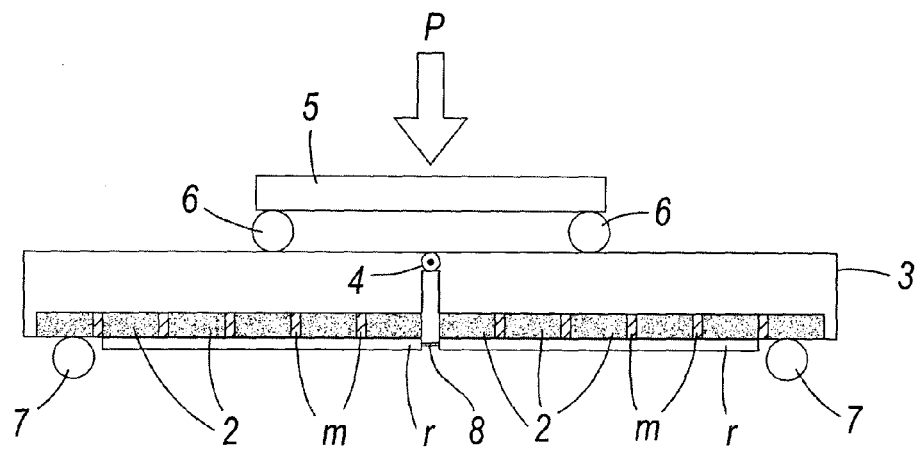
FIG. 2 shows a side view of the test piece positioned in a machine.

FIG. 2 is a side view of the test piece positioned on the machine which subjects it bending until it breaks.

Two separate piles 1 of six bricks 2 are firstly prepared, those of each pile being assembled together with a fixing mortar m of known type (applied thickness 10 mm). The two piles 1 of bricks 2 are then positioned mutually aligned, as shown in FIGS. 1 and 2, but maintaining these piles spaced apart to create a central empty space v=20 mm between them.

After saturating the assembled bricks with water, but avoiding any water accumulations, a first uniform layer of mortar mixed with water to obtain the desired consistency is applied (with a smooth metal blade) to a thickness of about 3 mm for an area of 350×220 mm$^2$ onto the upper surface of each of the two piles of aligned bricks (FIG. 1), taking care that the mortar does not penetrate into the empty region v existing between the opposing surfaces of the two piles 1 of aligned bricks.

A carbon fibre mesh (of width s=220 mm and length l=720 mm) is then rested on the upper surface of the two first mortar layers, embedding the mesh into the first mortar layer: a second mortar layer (of thickness about 3 mm) is then applied, to entirely cover the mesh, then smoothing its free outer surface to form the desired reinforcement layer r. It should be noted that to obtain comparable resistance data, the reinforcement mesh 8 of all the mortar layers of the examples must always be the same, a carbon fibre mesh 8 always being used herein.

To determine the maximum breakage load which causes separation of the reinforcement from the masonry test pieces (heretofore described) subjected to a bending test, the procedure is as shown schematically in FIG. 2: each test piece is inserted into a strong rigid metal enclosure formed from two separate boxes 3 connected together by a hinge 4 which enables each box 3 to be rotated relative to the other.

As can be seen in FIG. 2, the test piece is rested at its two ends on two separate lower supports 7 external to the reinforcement r. By way of two bearings 6 (resting on the outer surface of the boxes 3) and a rigid plate 5, a load P of increasing value is applied, to determine the maximum load (breaking load) which causes the reinforcement r to separate from the masonry test piece subjected to the bending test.

The following Table indicates (for each mortar of the Examples of the present description) the values of the maximum load measured in the tests which put the various test pieces under crisis.

| MORTAR TYPE | MAXIMUM BREAKAGE LOAD (kN) |
|---|---|
| Mortar A | 9.60 |
| Mortar B | 9.32 |
| Mortar C | 8.87 |
| Mortar D | 9.45 |
| Mortar E | 9.39 |
| Mortar F | 8.71 |
| Mortar G | 8.63 |
| Mortar H | 9.28 |
| Mortar I | not determinable |
| Mortar L | 3.73 |
| Mortar M | 4.11 |
| Mortar N | 4.35 |

The aforegoing results display mechanical behaviour, in particular a resistance to delamination, which is clearly superior for the reinforcement formed with the mortar of the present invention, compared to those obtained with mortars formed differently.

Analogous results are obtained if the mortars are used reinforce test pieces of concrete and reinforced concrete: in that case the procedure followed for carrying out the tests is the same as that described in detail in the aforesaid prior patent applications of the present applicants WO2007/054388A and the corresponding EP1893793A and US 2008/0286553A.

The invention claimed is:

1. A cementitious mortar consisting of:
   (a) 5% to 89.595% of a cement,
   (b) 10% to 70% of an inert mineral filler having a particle dimension less than 700 microns,
   (c) 0.05% to 2.5% of at least one additive selected from the group consisting of a fluidifying additive and a superfluidifying additive,
   (d) 0.005% to 1% of a thixotropic additive of a cellulose class,
   (e) 0.3% to 24% of a methylmethacrylate/n-butylacrylate copolymer resin, and
   (f) 0.05% to 30% of a glass filament dispersed in the mortar, the glass filament having a length of 1 to 30 mm and a diameter of 5 to 100 microns, and
   (g) a laurylsulphonic acid compound in an amount of up to 1.5%,
   the percentages being by weight referred to the total weight of the cementitious mortar.

2. The mortar of claim 1, wherein the glass filament (f) has a length of 3 mm to 24 mm and a diameter of 8 microns to 85 microns.

3. The mortar of claim 1, wherein the methylmethacrylate/n-butylacrylate copolymer resin (e) is present in an amount of 0.5% to 18% by weight.

4. The mortar of claim 1, wherein the glass filament (f) is present in an amount of 0.4% to 23% by weight.

5. The mortar of claim 1 which is suitable for forming a structure incorporating a web comprising a synthetic fiber, wherein the synthetic fiber comprises at least one selected from the group consisting of a glass fiber, a carbon fiber, a polymer fiber, and a poly[benz(1,2-D:5,4-D')bisoxazole-2, 6-diyl-1,4-phenylen] fiber.

6. The mortar of claim 1, wherein the glass filament (f) is an alkali resistant glass filament.

7. The mortar of claim 1, wherein the glass filament (f) has a length of 3 mm to 24 mm and a diameter of 8 microns to 85 microns.

8. The mortar of claim 1, wherein the cement (a) is present in an amount of 20% to 70% by weight.

9. The mortar of claim 1, wherein the cement (a) is at least one cement selected from the group consisting of a Portland cement, a composite Portland cement, a blast furnace cement, a pozzolan cement, and a composite cement.

10. The mortar of claim 1, wherein the additive (c) is a fluidifying additive.

11. The mortar of claim 1, wherein the additive (c) is a superfluidifying additive.

12. The mortar of claim 1, wherein the additive (c) is an acrylic superfluidifier.

13. The mortar of claim 1, wherein the thixotropic additive (d) is at least one selected from the group consisting of methylcellulose, methyl hydroxyethyl cellulose, methylhydroxypropylcellulose, hydroxyethyl cellulose, hydroxypropylcellulose, carboxymethylcellulose, and carboxymethylhydroxyethylcellulose.

14. The mortar of claim 1, wherein the thixotropic additive (d) is present in an amount of 0.015% to 0.65% by weight.

15. The cementitious mortar of claim 1, wherein
    the cement (a) is a Pozzolan cement present in an amount of from 6.80 to 87.28%,
    the inert mineral filler (b) is quartz having a dimension of 0.1-0.35 mm,
    the thixotropic additive is methylcellulose in an amount of 0.006-0.9%,
    the fluidifying additive is an acrylic present in an amount of from 0.05-2.4%,
    the methylmethacrylate/n-butylacrylate copolymer resin is present in an amount of 0.5-24%, and
    the glass filament (f) is present in an amount of 0.075-27%.

16. The cementitious mortar according to claim 1, consisting of:
    (a) from 6.80 to 87.28% of the cement,
    (b) from 10.79 to 68.40% of the inert mineral filler,
    (c) from 0.05 to 2.40% of an acrylic superfluidifying additive,
    (d) from 0.01 to 0.9% of the thixotropic additive,
    (e) from 0.5 to 23.90% of the copolymer resin, and
    (f) from 0.08 to 27% of the glass filament.

17. The cementitious mortar of claim 16, wherein the cement is Pozzolan cement, the inert filler is silica fume, the superfluidifying additive is acrylic superfluidifier, and the thixotropic additive is methylcellulose.

18. The cementitious mortar of claim 1, to which an ether lauryl sulphonate is added in an amount of from 0.25-1.5% and the cement (a) is present in an amount of 5-89.345%.

* * * * *